(12) United States Patent
Yuguchi

(10) Patent No.: US 7,387,245 B2
(45) Date of Patent: Jun. 17, 2008

(54) INFORMATION PATTERN DISCRIMINATING APPARATUS

(75) Inventor: Tasuku Yuguchi, Kyoto (JP)

(73) Assignee: Optex Fa Co., Ltd., Kyoto (JP)

( * ) Notice: Subject to any disclaimer, the term of this patent is extended or adjusted under 35 U.S.C. 154(b) by 261 days.

(21) Appl. No.: 11/078,284

(22) Filed: Mar. 14, 2005

(65) Prior Publication Data
US 2005/0205669 A1    Sep. 22, 2005

(30) Foreign Application Priority Data
Mar. 17, 2004  (JP) ............................. 2004-075945
Nov. 19, 2004  (JP) ............................. 2004-335528

(51) Int. Cl.
*G06K 7/00* (2006.01)
(52) U.S. Cl. .................................... 235/436; 235/492
(58) Field of Classification Search ........... 235/462.16, 235/462.18, 462.24, 462.25, 436, 492
See application file for complete search history.

(56) References Cited

U.S. PATENT DOCUMENTS

| | | | | |
|---|---|---|---|---|
| 4,147,295 A | * | 4/1979 | Nojiri et al. ........... 235/462.19 |
| 4,411,016 A | * | 10/1983 | Wakeland .................... 382/318 |
| 5,521,371 A | * | 5/1996 | Hotta et al. .................. 235/487 |
| 5,902,986 A | * | 5/1999 | Barkan et al. ......... 235/462.25 |
| 5,979,765 A | * | 11/1999 | Watanabe et al. ...... 235/462.25 |
| 5,988,507 A | * | 11/1999 | Ikeda et al. ............ 235/462.25 |
| 6,616,056 B2 | * | 9/2003 | Cato .......................... 235/495 |

OTHER PUBLICATIONS

Patent Abstracts of Japan; Publication No. 09-273923; Published Oct. 21, 1997; Keyence Corp.

* cited by examiner

*Primary Examiner*—Ahshik Kim
(74) *Attorney, Agent, or Firm*—Sughrue Mion, PLLC

(57) ABSTRACT

The information pattern signal, detected of the product, is compared with the standard information pattern signal and the OK determination is made in the event that the information pattern signal coincides with the standard information pattern signal within the tolerated time deviation width, but the NG determination is made in the event that the information pattern signal does not coincide with the standard information pattern signal. Accordingly, any time deviation occurring in the information pattern signal as a result of movement of the product or the sensor can be accommodated. Thus, the OK/NG determination of the product can be accurately accomplished in a simplified manner and in a short length of time.

8 Claims, 8 Drawing Sheets

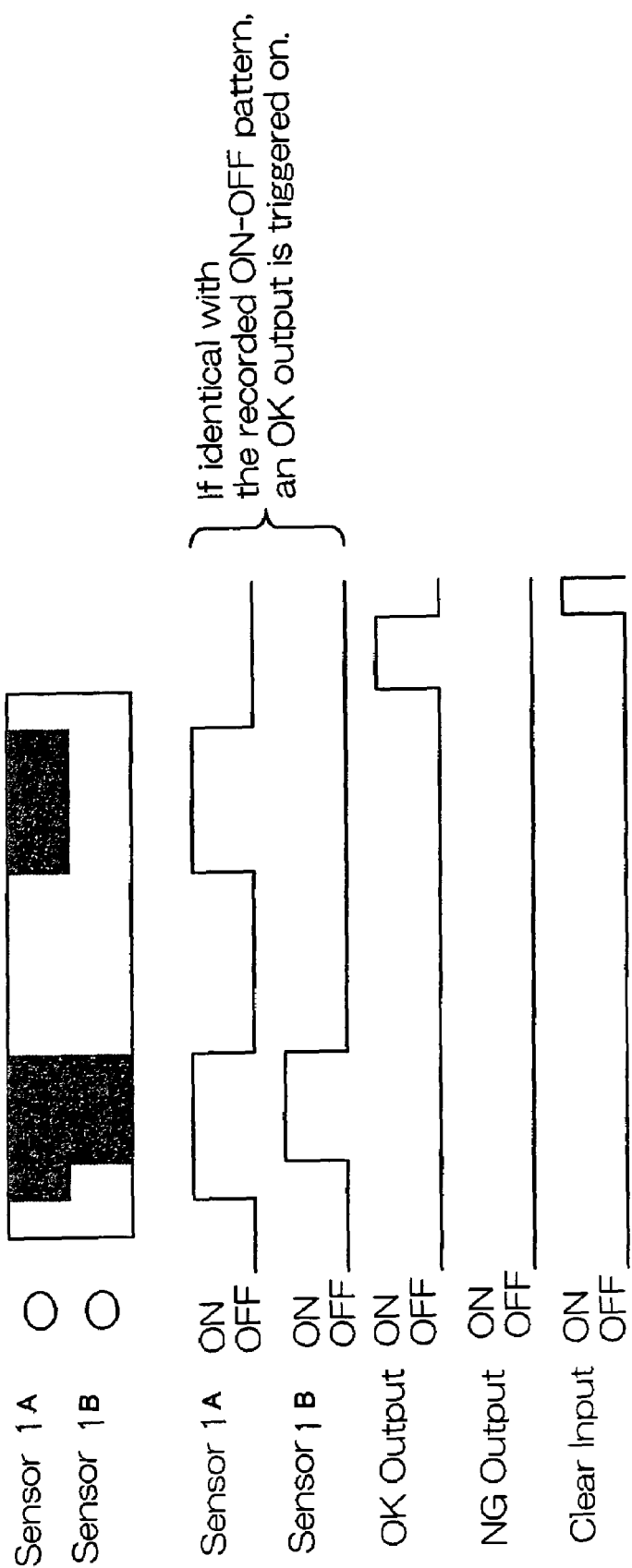

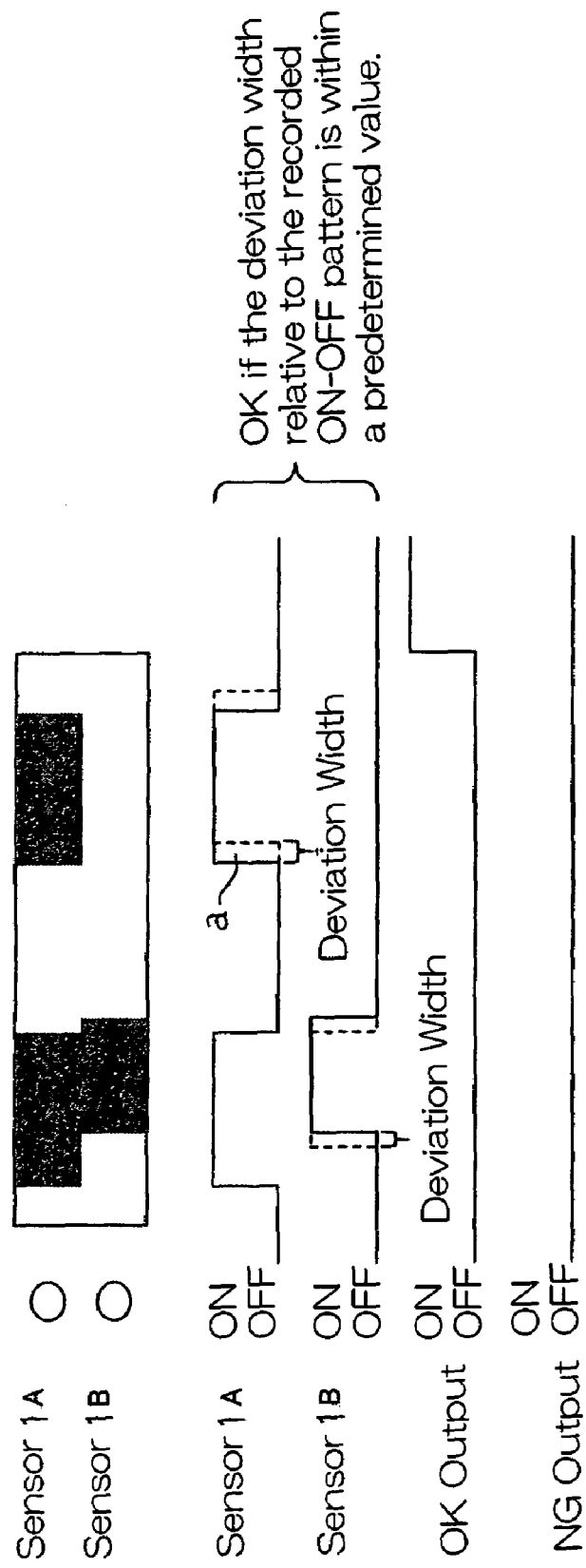

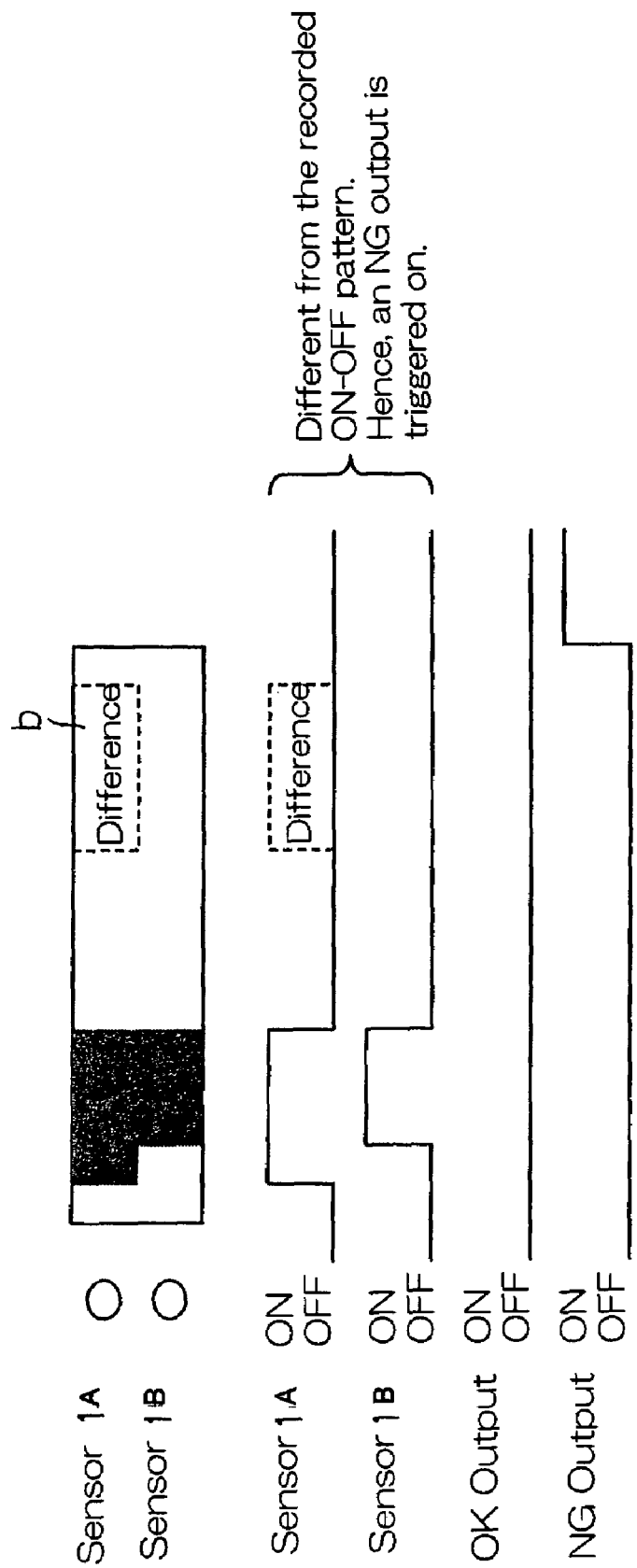

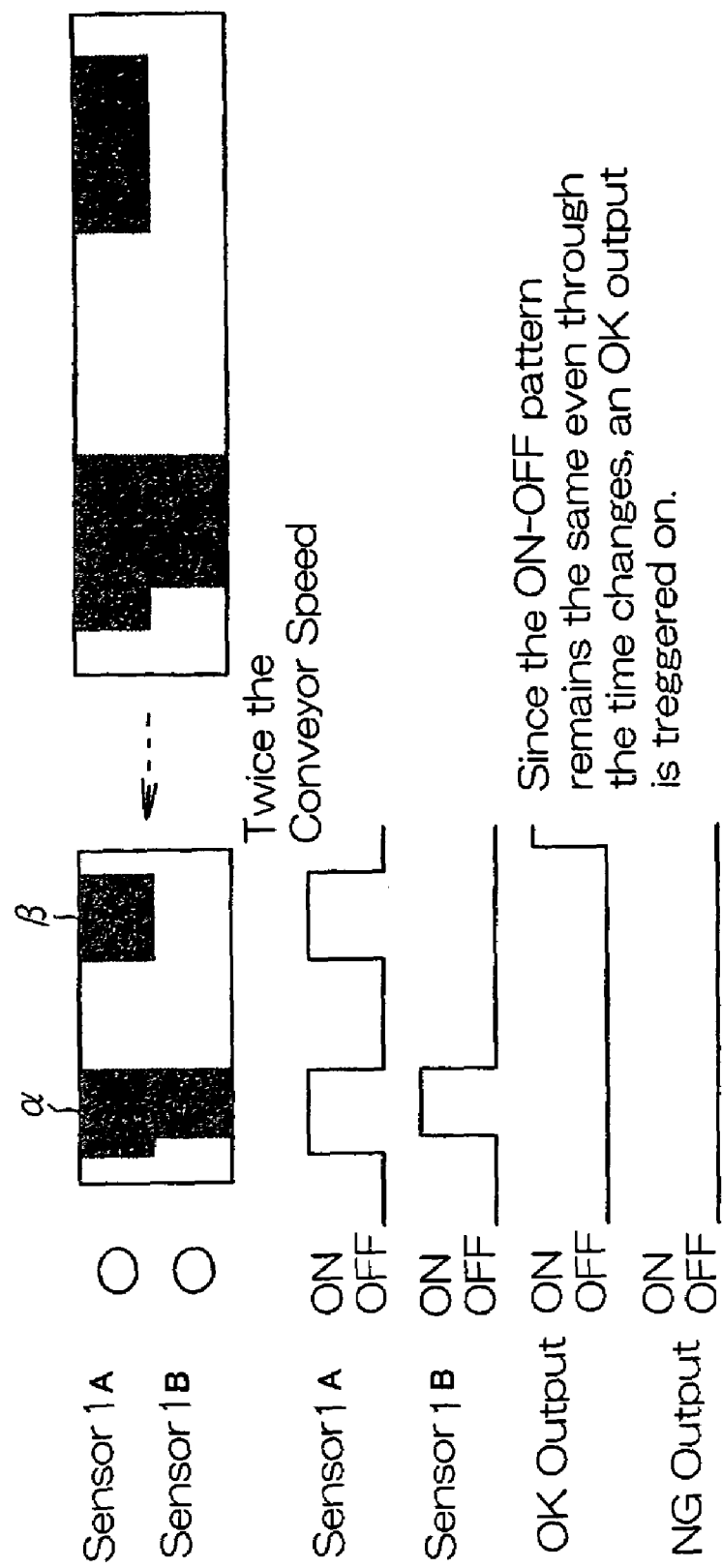

INFORMATION PATTERN DISCRIMINATING APPARATUS

BACKGROUND OF THE INVENTION 1. (Field of the Invention)

The present invention relates to an information pattern discriminating apparatus for determining a product based on a signal indicative of the information pattern, which is detected by a sensor with respect to such product while one of the product and the sensor is moved relative to the other of the product and the sensor. Particularly, the present invention relates to the information pattern discriminating apparatus capable of accommodating a time deviation attributable to the movement of one of the product and the sensor relative to the other of the product and the sensor.

2. (Description of the Prior Art)

In the conveyor line for sorting products, the information pattern discriminating apparatus has hitherto been used for determining the products one by one based on results of detection performed by a sensor with respect to the by a sensor with respect to theach of those products. With this conventional information pattern discriminating apparatus, while the products are successively transported from one processing station towards another processing station, the sensor detects the information pattern specific to each of the products, such as an information pattern regarding the shape of each product or an information pattern uniquely applied to each product, so that each of the products can be identified on the basis of the result of detection performed by the sensor.

More specifically, by way of example, the conventional information pattern discriminating apparatus includes a photosensor for detecting an information pattern, for example, a black-and-white grid pattern, made up of an array of black areas and an array of white areas alternating with the black areas as shown in FIG. 9A. The black-and-white grid pattern is printed on a label applied to each of the products to be identified. When in operation, the photodetector outputs an ON signal when it detects the white areas of the information pattern, but an OFF signal when it detects the black areas of the information pattern, to eventually provide an ON-OFF pattern signal for each of the products. This ON-OFF pattern signal is subsequently compared with a standard ON-OFF pattern signal indicative of an acceptable sound product and, if the ON-OFF pattern signal detected by the photodetector coincides with the standard ON-OFF pattern signal, an OK determination is made (i.e., the product detected is determined as acceptable), but if the ON-OFF pattern signal detected by the photodetector does not coincide with the standard ON-OFF pattern signal, an NG determination is made (i.e., the product detected is determined as unacceptable).

In such case, in the conventional information pattern discriminating apparatus, as shown in FIG. 9B, using a plurality of, for example, two, photosensors 1A and 1B capable of detecting such an information pattern as shown in FIG. 9A, an internal counter is counted up in dependence on change of ON and OFF to manage the state, and the ON-OFF pattern signal (information pattern signal) is obtained by adding the length of time required for the count of the internal counter to change and the ON-OFF state of the photosensor 1B when the ON-OFF state of the photosensor 1A changes. Since the ON-OFF pattern signal given by the standard product (acceptable sound product) is used as the standard ON-OFF pattern signal with which the ON-OFF pattern signal given by the product being detected is determined, the apparatus must store it and, with the use of, for example, a programmable logic controller (PLC), it is necessary to convert it into a program before it is inputted.

Since where the PLC is used, the ON-OFF pattern differs from one product class to another, the ON-OFF pattern that differs from one product class being manufactured to another must be converted into a program, requiring cumbersome and time-consuming procedures. For this reason, a data processing apparatus has been suggested in, for example, the Japanese Laid-open Patent Publication No. 9-273923, in which an acceptable sound product is transported by a conveyor and is detected by a photodetector to provide a standard signal waveform indicative of the acceptable sound product, so that even if the product class change, an input signal waveform given by a product can be compared with the standard signal waveform to thereby determine the produce so detected.

With this data processing apparatus, since no accurate discrimination is possible in the event that an object being transported by the conveyor deviates in position by an undulated movement of the conveyor and the position of the object changes for each measurement, the deviation in position of an analog input signal waveform relative to the standard signal waveform must be determined so that a process can be executed to move the input signal waveform by a quantity corresponding to the deviation in position.

However, since the above mentioned data processing apparatus merely move the position of the input signal waveform in a quantity corresponding to the deviation in position relative to the standard signal waveform, the data processing apparatus is incapable of accommodating instantaneous change of the speed of the conveyor, such as caused by a vibration such as occurring upon jerky movement of the conveyor itself and/or abrupt placement of a product on the conveyor, or deviation in time attributable to movement of the product such as in the case of temporary change of the speed of the conveyor under the influence of, for example, a load imposed on the conveyor or for the convenience of the production, resulting in a problem associated with incapability of discrimination or reduction of the discriminating accuracy. Also, where the information pattern of the products that are placed on respective tables are to be detected while the sensor is moved relative to the products, similar problems occurs when the time deviation occur as a result of the movement of the sensor.

SUMMARY OF THE INVENTION

In view of the foregoing, the present invention has been devised with a view to substantially eliminate the above discussed problems and is intended to provide an improved information pattern discriminating apparatus capable of accomplishing an accurate determination simply and in a short length of time even though the time deviation attributable to the movement occurs when the information pattern unique to the product is discriminated.

In order to accomplish the foregoing object, the present invention in accordance with one aspect thereof provides an information pattern discriminating apparatus for discriminating product based on information pattern signal detected of the product by a sensor while one of the product and the sensor is moved relative to the other of the product and the sensor. This information pattern discriminating apparatus includes a standard signal storage means for storing a standard information pattern signal detected within a designated time width in connection with a product that is used as a standard product, a time deviation width setting means for setting a predetermined tolerated time deviation width of the information pattern signal of the product, and a determining means for comparing the information pattern signal, detected of the product, with the standard information pattern signal and for performing an OK determination in the event that the information pattern signal coincides with the standard information pattern signal within the tolerated time deviation width, but an NG determination in the event that the information pattern signal does not coincide with the standard information pattern signal.

According to the present invention, since the information pattern signal, detected of the product, is compared with the standard information pattern signal and the OK determination is made in the event that the information pattern signal coincides with the standard information pattern signal within the tolerated time deviation width, but the NG determination is made in the event that the information pattern signal does not coincide with the standard information pattern signal, any time deviation occurring in the information pattern signal as a result of movement of the product or the sensor can be accommodated and, therefore, the OK/NG determination of the product can be accurately accomplished in a simplified manner and in a short length of time.

Preferably, the determining means operates further to determine that the information pattern signal and the standard information pattern coincide with each other in the event that where the time deviation width of the information pattern signal is different from the designated time width of the standard information pattern signal, the ratio of respective times of constituent patterns of those information pattern signals is the same among different constituent patterns, but that the information pattern signal and the standard information pattern do not coincide with each other in the event that the time deviation width of the information pattern signal deviates from the designated time width by a quantity equal to a predetermined value or more. Accordingly, even though the time width of the information pattern signal and the designated time width of the standard reference pattern signal differ from each other as a result of a deviation in speed of movement of the product or the sensor, this difference can be accommodated and, therefore, the OK/NG determination of the product can be accurately accomplished in a simplified manner and in a short length of time.

Preferably, the information pattern discriminating apparatus may further include an input inhibiting circuit for inhibiting an input of a designated input inhibiting information when the input inhibiting information specified in connection with the product is detected from the sensor. In this case, even though the product contains a portion (input inhibiting information) which will result in instability of the sensor detection, the product determination can be smoothly performed continuously merely by inhibiting the input of the designated information without adversely affecting the detection of other portions by the sensor, with no need to any countermeasure such as powering an electric source for such sensor off so that the input signal of that portion can be isolated.

The present invention in accordance with another aspect thereof also provides an information pattern discriminating apparatus for discriminating product based on information pattern signal detected of the product by a sensor while one of the product and the sensor is moved relative to the other of the product and the sensor, which apparatus includes a standard signal storage means for storing a standard added time of a standard information pattern signal, which is added with respective designated times of two standard information pattern signals before and after change of a pattern of the standard information pattern signal detected within a time width specified to a product which serves as a standard product, a time deviation width setting means for setting a predetermined tolerated time deviation width of the information pattern signal of the product, and a determining means for performing an OK determination in the event that where the time width of the information pattern signal is different from the designated time width of the standard information pattern signal, an added time of two information pattern signals before and after change of a pattern detected of the product and a time of the information pattern signal, which has been converted based on a time ratio relative to the standard added time are within the tolerated time deviation width, and an NG determination in the event that the added time of the two information pattern signals before and after change of the pattern and the time of the information pattern signal, which has been converted, do not fall within the tolerated time deviation width.

According to such another aspect of the present invention, the OK determination is performed in the event that where the time width of the information pattern signal is different from the designated time width of the standard information pattern signal, an added time of two information pattern signals before and after change of a pattern detected of the product and a time of the information pattern signal, which has been converted based on a time ratio relative to a standard added time are within the tolerated time deviation width, but the NG determination is performed in the event that the added time of the two information pattern signals before and after change of the pattern and the time of the information pattern signal, which has been converted, do not fall within the tolerated time deviation width. Accordingly, even in the case where the time of movement of the product or the sensor varies (due to acceleration or deceleration), this can be accommodated based on the information before and after the change of the pattern and, therefore, the OK/NG determination of the product can be accomplished in a simplified manner and in a short length of time.

Preferably, the standard signal storage means is of a type capable of storing respective standard information pattern signals associated with a plurality of products and the determining means performs the OK determination and the NG determination with respect to those plural products.

Preferably, the information pattern signal is an ON-OFF signal. Also, the sensor is preferably a photosensor.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3 is a timing chart showing an OK determining operation of the information pattern discriminating apparatus shown in FIG. 1;

FIG. 4 is a timing chart showing the operation to tolerate the width of a time deviation;

FIG. 5 is a timing chart showing an NG determining operation of the information pattern discriminating apparatus shown in FIG. 1;

FIG. 6 is a timing chart showing the determining operation when the time width is different;

DETAILED DESCRIPTION OF THE EMBODIMENTS

The present invention will now be described in detail in connection with a preferred embodiment thereof with reference to the accompanying drawings.

Figure 1:
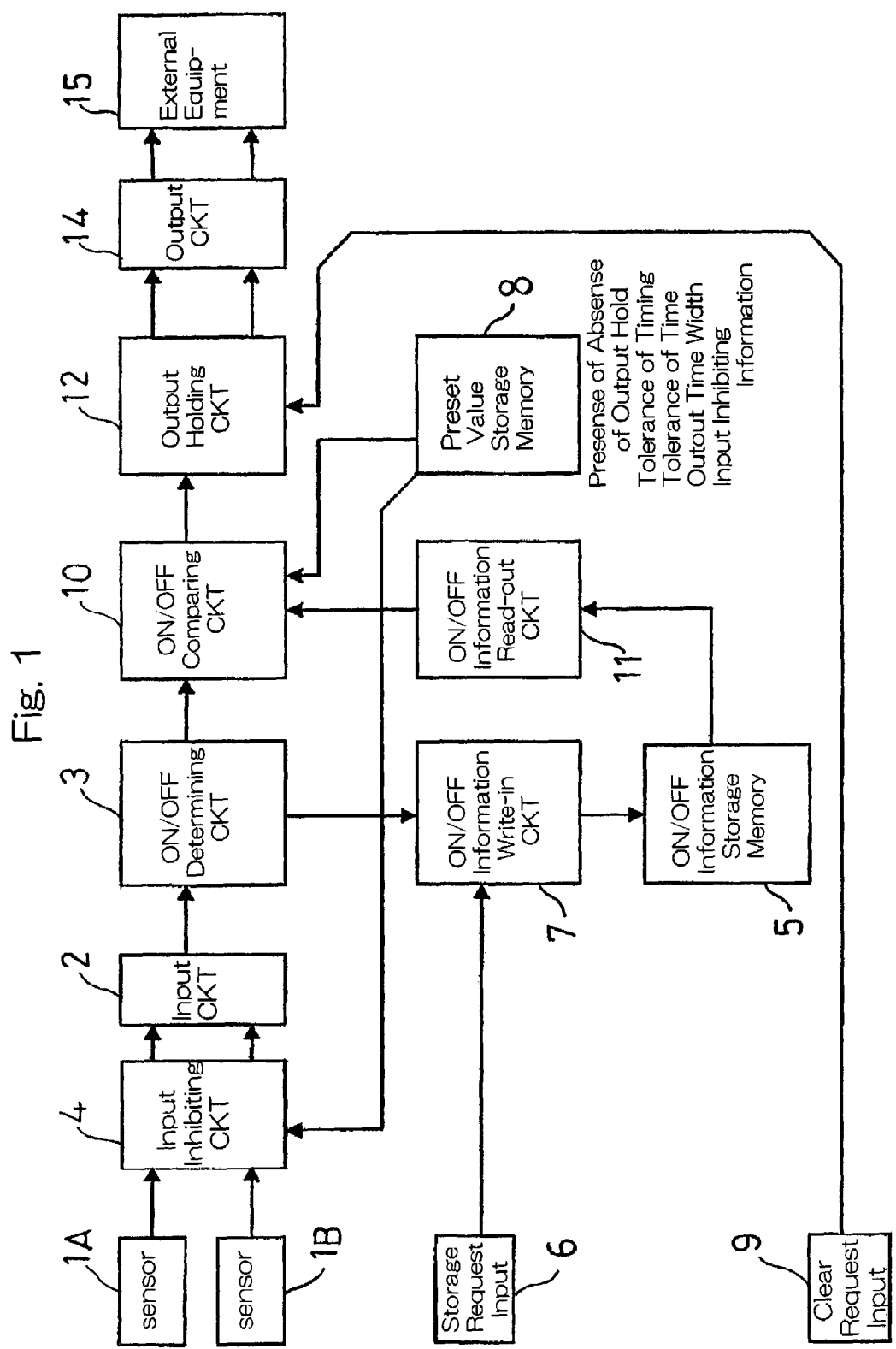
FIG. 1 is a circuit block diagram showing an information pattern discriminating apparatus according to a preferred embodiment of the present invention.

FIG. 1 illustrates a circuit block diagram of an information pattern discriminating apparatus according to a first preferred embodiment thereof. The information pattern discriminating apparatus shown therein is used to determine whether a product is considered OK (correct) or NG (error), i.e., acceptable or unacceptable, based on an information pattern signal detected of such product from a sensor device while one of the product and the sensor for detecting an information pattern on a label applied to such product is moved relative to the other of the product and the sensor device. In this embodiment, the sensor device is provided fixed to a conveyor line for sorting products and, while a plurality of products are successively transported by the conveyor, respective information patterns of those products are detected by the sensor device one at a time.

The illustrated information pattern discriminating apparatus includes, for example, two sensors 1A and 1B, an input inhibiting circuit 4, an input circuit 2, an ON/OFF determining circuit 3, an ON/OFF information storage memory 5 which is a standard signal storage means, a storage request input section 6, an ON/OFF information write-in circuit 7, a preset value storage memory 8 which is a time deviation width setting means, a clear request input section 9, an ON/OFF comparing circuit 10 which is a determining means, an ON/OFF information read-out circuit 11, an output holding circuit 12, an output circuit 14 and an external equipment 15.

Figure 9A:
FIG. 9A is a plan view showing an example of the information pattern.
Figure 9B:
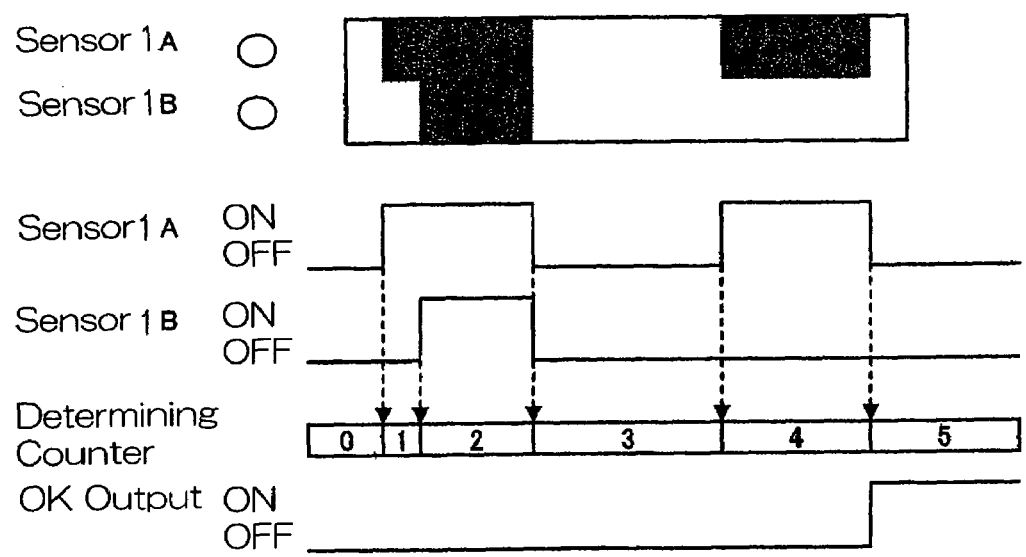
FIG. 9B is a timing chart showing an acquisition of the standard information pattern signal with the conventional information pattern discriminating apparatus.

The information pattern applied to the product is a black-and-white grid pattern printed, or otherwise formed, on a label and made up of an array of black areas and an array of white areas alternating with the black areas as shown in FIG. 9A. Each of the sensors 1A and 1B is, for example, a photosensor having a light receiving element capable of detecting rays of light projected from a light source onto the label and subsequently reflected from such label. Since the reflected rays of light changes according to white and black areas forming the information pattern, change of the reflected rays of light is converted into an electric signal (a binary signal), for example, an ON output and an OFF output are generated upon detection of the white areas and the black areas, respectively, with a detection signal consequently outputted. Although in the illustrated embodiment the two sensors are employed, a single sensor or three or more sensors may employed depending on the information pattern of a product.

As shown in FIG. 1, the input circuit 2 receives respective detection signals from the sensors 1A and 1B and the ON/OFF determining circuit 3 determines the ON-OFF state of each of the detection signals inputted thereto. The ON/OFF information storage memory (standard signal storage means) 5 stores a standard information pattern (standard ON-OFF pattern) signal detected within a predetermined time width preset for the standard product (acceptable product). In response to a storage request input (TEACH input) fed from the storage request input section 6, this standard ON-OFF pattern signal is stored in the OFF information storage memory 5 through the ON/OFF information write-in circuit 7 based on the detection signal from the ON/OFF determining circuit 3, of which ON-OFF state has been determined.

The preset value storage memory (time deviation width setting means) 8 stores a predetermined tolerated time deviation width of the information pattern (ON-OFF pattern) signal of the product, for example, a preset value representative of the tolerance level of the timing and the length of time. This tolerated time deviation width is set in dependence on an instantaneous change in speed of the conveyor, which would be brought about by a vibration such as caused upon jerky movement of the conveyor itself and/or placement of the product on the conveyor and may be set to, for example, 100 μsec. Also, the preset value storage memory 8 stores respective preset values representative of the presence or absence of an output holding, an output time width and an input inhibiting information. The contents stored in the preset value storage memory 8 can be cleared in response to a clear request input fed from the clear request input section 9.

The ON/OFF comparing circuit (determining means) 10 is operable to compare the information pattern (ON-OFF pattern) signal detected of the product with the standard information pattern (standard ON-OFF pattern) signal stored in the preset value storage memory 8. Specifically, if this ON-OFF pattern signal coincide with the standard ON-OFF pattern signal within the tolerated time deviation width stored in the preset value storage memory 8, the ON/OFF comparing circuit 10 issues an OK output to thereby perform an OK determination (i.e., to thereby determine that the product is acceptable), but if it does not coincide with the standard ON-OFF pattern signal within the tolerated time deviation width, it issues an NG output to thereby perform an NG determination (i.e., to thereby determine that the product is unacceptable).

The output holding circuit 12 is operable to hold the NG output from the ON/OFF comparing circuit 10. Specifically, since it may occur that the NG output is passed by, this output holding circuit 12 holds the NG output by the time the NG output is cleared. The OK output or the NG output is outputted to the external equipment 15 through the output circuit 14 so that the products can be sorted according to an output therefrom.

The input inhibiting circuit 4 referred to above, when detecting from the sensors 1A and 1B an input inhibiting information specified to the product, inhibits input of this information to the input circuit 2. The input inhibiting information may include, for example, letters, numerical characters and/or symbols which would cause detection by the sensors to be unstable and is stored in the preset value storage memory 8.

Hereinafter, the operation of the information pattern discriminating apparatus of the structure described above will be described.

(Acquisition of Standard Information Pattern Signal)

Figure 2:
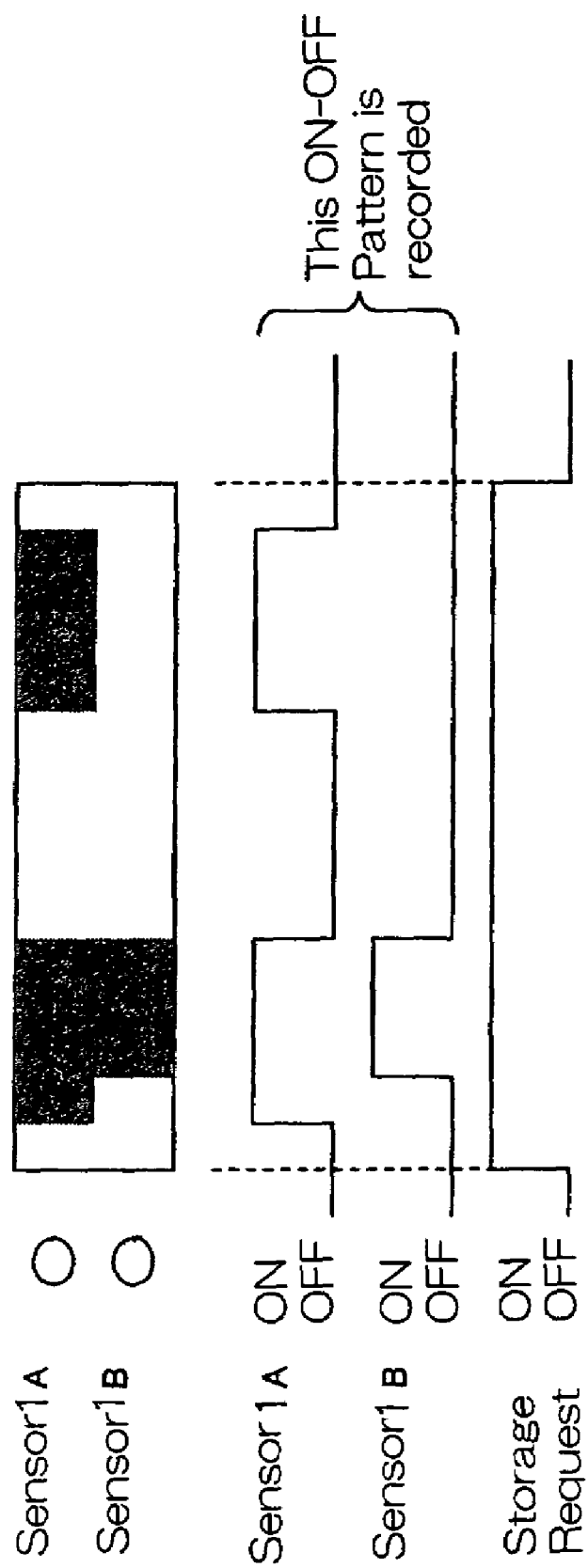
FIG. 2 is a timing chart showing an acquisition of a standard information pattern.

In the first place, while the product (acceptable product) which will be used as a standard product is, after having been placed on a conveyor, transported by the conveyor, the ON-OFF pattern (information pattern) printed or otherwise formed on a label applied to the acceptable product is detected by the sensors 1A and 1B shown in FIG. 1. These detection signals from the sensors 1A and 1B are supplied to the input circuit 2 and then to the ON/OFF determining circuit 3, by which the ON-Off state of each of the detection signals from the sensors 1A and 1B is determined, and ON-OFF states of the detection signal from the sensor 1A and ON-OFF states of the detection signal from the sensor 1B are determined. At this time, as shown in FIG. 2, the storage request input (TEACH input) is triggered on from the storage request input section 6 and, when it is inputted to the ON/OFF information write-in circuit 7, the standard ON-OFF pattern signal for the acceptable product, which is in the form of two ON-OFF pattern signals within the ON period (assigned time width) of the TEACH signal, is stored (recorded) in the ON/OFF information storage memory 5.

(Determination of Product)

Thereafter, while products to be determined are, after having been placed on the conveyor, transported successively by the conveyor, the OK/NG determination of the products one at a time is performed to determine whether the individual product to be determined is acceptable or unacceptable (rejected). Assuming that the conveyor is driven at a normal transport speed and when the ON-OFF pattern signal of the product is detected as shown in FIG. 3, the ON/OFF comparing circuit (determining means) 10 compare the ON-OFF pattern signal with the standard ON-OFF pattern signal. Since in the example now under discussion, the ON-OFF pattern signal coincides with the standard ON-OFF pattern signal, an OK output is triggered on to thereby accomplish an OK determination (i.e., to determine that the product so detected is acceptable). Subsequently, the clear input is triggered on to clear the OK output.

In the event that the transport speed of the conveyor fluctuates momentarily under the influence of a vibration resulting from jerky movement of the conveyor and/or placement of the product on the conveyor, a time deviation occur in the ON-OFF pattern signal of the product. However, in the present invention, the determination is considered possible if the time deviation is within the predetermined tolerated time deviation width. In other words, assuming that the tolerated time deviation width stored in the preset value storage memory 8 is, for example, 100 μsec, as shown in FIG. 4, the time difference is determined in the ON/OFF comparing circuit 10 with respect to one of patterns forming each of the detection signals and, when the time deviation width a between those detection signals is, for example, 80 μsec, which is smaller than the tolerated time deviation width (100 μsec), calculation is performed to determine that the time deviation is zero. In such case, if it is considered that no time deviation occur, it means that the pattern signals coincide with each other and, therefore, the OK output is triggered to accomplish the OK determination. In this way, the comparison of the ON-OFF pattern signal of the product can be made in compliance with the time deviation with the standard ON-OFF pattern signal.

On the other hand, when the ON-OFF pattern signal of the product such as shown in FIG. 5 is detected, such ON-OFF pattern signal is compared by the ON/OFF comparing circuit (determining means) 10 with the standard ON-OFF pattern signal. Since in this case there is a difference in a portion b of the ON-OFF pattern signal, the ON-OFF pattern signal and the standard ON-OFF pattern signal do not coincide with each other and, therefore, the NG output is triggered on to accomplish the NG determination (i.e., to determine that the product is unacceptable).

As described above, with the information pattern discriminating apparatus of the present invention, after the ON-OFF pattern signal detected of the product has been compared with the standard ON-OFF pattern signal stored of the standard product, the OK determination is made when the ON-OFF pattern signal detected of the product coincides with the standard ON-OFF pattern signal stored of the standard product within the predetermined tolerated time deviation width, but when they do not coincide with each other, the NG determination is made. Accordingly, unlike the conventional apparatus which requires the standard ON-OFF pattern signal to be converted into a program and inputted and which can accommodate a deviation in position, but not a deviation in time, the information pattern discriminating apparatus of the present invention can accomplish an accurate OK/NG determination of the products one at a time in a simplified manner and in a short length of time since even when the time deviation occurs in the ON-OFF pattern signal as a result of the movement of the product or the sensors, such time deviation can be accommodated.

In the event that the transport speed itself of the conveyor temporarily changes under the influence of a load imposed on the conveyor or for the convenience of production, not the transport speed of the conveyor momentarily change in the manner discussed hereinabove, it may occur that the transport speed of the conveyor when the standard ON-OFF pattern signal is acquired and the transport speed of the conveyor when the ON-OFF pattern signal of each of the products is determined differ from each other. Where the time width of the ON-OFF pattern signal of the product differs from the predetermined time width of the standard ON-OFF pattern signal, the ON/OFF comparing circuit (determining means) 10 determines that when the ratio of respective times of constituent patterns of those signals remains the same, the ON-OFF pattern signal of the product coincides with the standard ON-OFF pattern signal, but when the time width of the ON-OFF pattern signal of the product deviates a predetermined value or greater from the predetermined time width, the ON-OFF pattern signal of the product does not coincide with the standard ON-OFF pattern signal.

FIG. 6 illustrates an example in which the conveyor transport speed when the standard ON-OFF pattern signal is acquired and the conveyor transport speed when the ON-OFF pattern signal of each of the products is determined differ from each other. In this example, the conveyor transport speed when the ON-OFF pattern signal of the product is determined is higher than, for example, twice the conveyor transport speed when the standard ON-OFF pattern signal has been acquired. In such case, the time width of the ON-OFF pattern signal of the product will be 1/2 of the time width of the standard ON-OFF pattern signal. In the illustrated example, the ratio of the time with respect to the constituent pattern α to the corresponding standard pattern is also 1/2 and therefore, the ratio of the time of the constituent pattern α to the corresponding standard pattern is the same as that of subsequent constituent pattern β, that is, 1/2, and accordingly, the ON-OFF pattern signal of the product and the standard ON-OFF pattern signal are deemed coinciding with each other to thereby accomplish the OK determination.

Figure 7A:
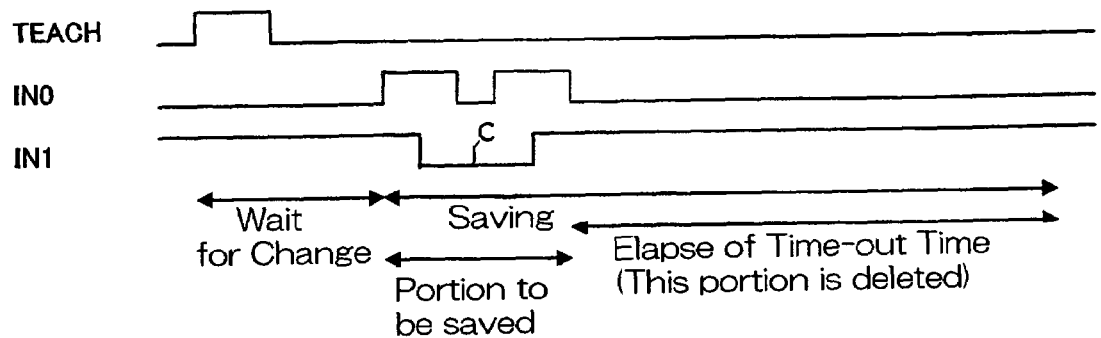
FIG. 7A is a timing chart showing an operation to store a standard information pattern signal.
Figure 7B:
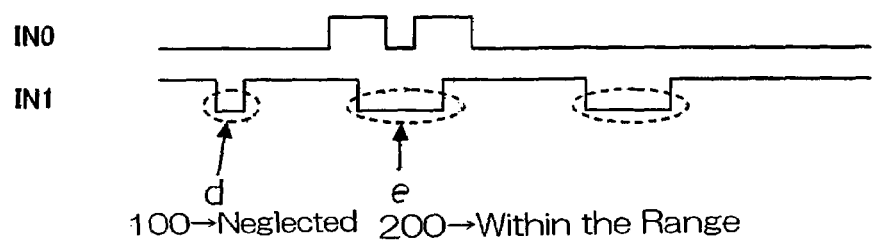
FIG. 7B is a timing chart showing the determining operation when the time width is different.

FIG. 7 illustrates another example, in which the conveyor transport speeds when the standard ON-OFF pattern signal and the ON-OFF pattern signal are detected differ from each other. Particularly, FIG. 7A illustrates an operation to acquire the standard ON-OFF pattern signal and FIG. 7B illustrates a timing chart showing the operation to determine the product, both of which will now be described hereinafter. The sampling time is, for example, 10 μsec and the following time width will be 200×10 μsec=2 msec if it is, for example, 200.

(Acquisition of Standard ON-OFF Pattern Signal)

Referring to FIG. 7A, reference character IN0 represents an ON-OFF signal from the sensor 1A and reference character IN1 represents an ON-OFF signal from the sensor 1B. Start takes place when the storage request input (TEACH input) of the storage request input section 6 is triggered on and if with respect to the standard product (acceptable product), one of the respective ON-OFF signals from the sensors 1A and 1B changes, saving (storage) of the ON-OFF signals starts. Then, the saving continues for a certain length of time even when none of those ON-OFF signals change any more. However, in the event that a predetermined time-out time elapses from the moment none of those ON-OFF signals change, data acquired subsequent to such moment at which those ON-OFF signals no longer change are deleted. In this way, while the memory capacity of the ON-OFF information storage memory 5 is saved, the standard ON-OFF pattern signal of the acceptable product is stored.

| IN0 | | Time Width | IN1 | | Time Width |
|-----|---|-----------|-----|---|-----------|
| OFF | 0 | 0 ms | ON | 100 | 1 ms |
| ON | 200 | 2 ms | OFF | 300 | 3 ms |
| OFF | 100 | 1 ms | ON | 100 | 1 ms |
| ON | 200 | 2 ms | | | |
| OFF | 0 | 0 ms | | | |

In those data, if one looks for the largest time width, one will find the OFF width 300 of the ON-OFF signal from the sensor 1B (See c in FIG. 7A) and, therefore, this time width is used as a reference in calculating the time ratio.

(Determination of Product)

As shown in FIG. 7B, with respect to the ON-OFF pattern signal detected of the product, the same pattern as the stored standard ON-OFF pattern signal is looked for. In the first place, the margin of the time width of the ON-OFF pattern signal of the product is set. By way of example, if this margin of the time width is set to 0.5 to 2 times, the set time width 150 to 600 will represent the range of detection. If the time width of the ON-OFF pattern signal of the product is out of the preset range of the time width, for example, if it is 100 as shown by d in FIG. 7B, it is smaller than 150 and, therefore, it is neglected as it is determined that dusts or the like have deposited on the ON-OFF pattern of the product.

If it is 200 as shown by e in FIG. 7B, it is within the predetermined range of the time width and, therefore, the ratio of the time is calculated from the time width and the preset time width.

Time Ratio=200/300=0.67

Based on this time ratio, storage is made to the last pattern position within the time width of the ON-OFF pattern of the product. The results are as follows:

| IN0 | | Time Width | IN1 | | Time Width |
|-----|---|-----------|-----|---|-----------|
| OFF | 3000 | 30 ms | ON | 67 | 0.67 ms |
| ON | 150 | 1.5 ms | OFF | 290 | 2.9 ms |
| OFF | 68 | 0.68 ms | ON | 200 | 2 ms |
| ON | 150 | 1.5 ms | ON | 70 | 0.7 ms |

In next place, the time width is again converted by 1/Time ratio.

| | | | | | |
|-----|---|-----------|-----|---|-----------|
| OFF | 4500 | 45 ms | ON | 100.5 | 1.005 ms |
| ON | 225 | 2.25 ms | OFF | 435 | 4.35 ms |
| OFF | 102 | 1.02 ms | ON | 300 | 3 ms |
| ON | 225 | 2.25 ms | ON | 105 | 1.05 ms |

Then, the data prior to the position at which the storage of the ON-OFF pattern signal of the product is initiated are deleted.

| | | | | | |
|-----|---|-----------|-----|---|-----------|
| OFF | 0 | 0 ms | ON | 0 | 0 ms |
| ON | 173 | 1.73 ms | OFF | 100 | 1 ms |
| OFF | 102 | 1.02 ms | ON | 300 | 3 ms |
| ON | 225 | 2.25 ms | ON | 105 | 1.05 ms |

Differences between the ON-OFF pattern signal of the product and the standard ON-OFF pattern signal are extracted.

| Time Width | | Differences |
|-----------|---|-------------|
| 173 | 27 | ON → OFF |
| 225 | 25 | OFF → ON |

In this case, since the total time width is 500 and since the time width of the differences is 52, the degree of coincidence of the ON-OFF pattern signal of the product with the standard ON-OFF pattern signal will be (500−52)/500× 100=89.6 (%). By way of example, the range of the degree of coincidence is set as follows, the ON-OFF pattern signal of the product is determined as coinciding with the standard ON-OFF pattern signal, resulting in the OK output.

Coincidence Degree=80~100 (%): OK output

Coincidence Degree=50~79 (%): NG output

Figure 8A:
FIG. 8 is a diagram showing an operation of an input inhibiting circuit.
Figure 8B:

As shown in FIG. 8, where the product class A has an ON-OFF pattern as shown by (A) in FIG. 8 and the product class B has an ON-OFF patter as shown by (B) in FIG. 8, an alphanumerical portion of the product class B, for example, "Best Before 2004.7.2", that is detected by the sensor 1B, is stored in the preset value storage memory 8 as an input inhibited information since the sensor detection is unstable and, if this information is detected, input thereof to the input circuit 2 is inhibited by the input inhibiting circuit 4. In such case, the product can be determined only with the detection of the product class B performed by the sensor 1A. Accordingly, even if the product contain a portion (input inhibited information) with which the sensor detection becomes unstable, the product determination can be smoothly performed continuously merely by inhibiting the input of the designated information without adversely affecting the detection of other portions by the sensor, with no need to any countermeasure such as powering an electric source for such sensor off so that the input signal of that portion can be isolated.

As hereinabove described, with the information pattern discriminating apparatus of the present invention, even though the time width of the ON-OFF pattern signal of the product and the designated time width of the standard ON-OFF pattern signal are different from each other due to any deviation in the speed of movement of the product or the sensors, it is possible to accomplish in compliance with the time deviation and, therefore, the OK/NG determination of the product can be accurately performed in a simplified manner and in a short length of time.

A second preferred embodiment of the present invention will now be described hereinafter. The information pattern discriminating apparatus according to this second embodiment is utilized where the length of time of movement of the product changes (accelerates or decelerates) in such a way that, for example, the conveyor for moving the produces successively is accelerated at the start of the operation, is subsequently driven at a predetermined constant speed and is finally decelerated at the end of the operation.

The information pattern discriminating apparatus according to this second embodiment differs from that according to the first embodiment shown in and described with reference to FIG. 1, in respect of the standard signal storage means (ON/OFF information storage memory) 5 and the determining means (ON/OFF comparing circuit) 10, it being however that other structural features than those circuit components are substantially similar to that according to the first embodiment and, therefore, the details thereof are not reiterated for the sake of brevity.

In the second embodiment, the standard signal storage means 5 stores a standard added time, in which with respect to the standard information pattern signal detected within the designated time width in connection with the product which will be used as a standard product, designated lengths of time of two standard information pattern signals before and after change of the pattern are added with, respectively. The determining means 10 performs the OK determination in the event that where the time width of the information pattern signal is different from the designated time width of the standard information pattern signal, the added times of the two information pattern signals before and after change of the pattern detected of the product and the length of time of the information pattern signal converted based on the time ratio with the standard added times is within the preset tolerated time deviation width, but performs the NG determination in the event that it deviates out of the tolerated time deviation width.

Hereinafter, the operation of the information pattern discriminating apparatus according to the second embodiment will be described. In the first place, examples of the degree of coincidence of the ON-OFF pattern signal (detected pattern) of the product with the standard ON-OFF pattern signal (registered pattern) is calculated based on the time ratio of the total time of the entirety where the conveyor transport speed at which the products are successively moved is fixed and the time of movement of the product does not vary (is neither accelerated nor decelerated).

| Registered Pattern | | Detected Pattern | | After Conversion | |
|---|---|---|---|---|---|
| State | Time | State | Time | (Divided by Time Ratio) | |
| ON | 100 ms | ON | 200 ms | 100 ms | coincide |
| OFF | 50 ms | OFF | 100 ms | 50 ms | coincide |
| ON | 25 ms | ON | 50 ms | 25 ms | coincide |
| OFF | 100 ms | OFF | 200 ms | 100 ms | coincide |
| ON | 75 ms | ON | 150 ms | 75 ms | coincide |
| OFF | 50 ms | OFF | 100 ms | 50 ms | coincide |
| ON | 100 ms | ON | 200 ms | 100 ms | coincide |

Total Time = 500 ms  Total Time = 1000 ms
Ratio = 1000 ms/500 ms = 2

However, when the conveyor for transporting the products successively is accelerated at the start of operation thereof and is decelerated at the end of the operation with the time of movement of the product consequently varying, the deviation will become large, for example, at the start of acceleration and at the end of acceleration during the acceleration and the product at that time will be determined defective as shown below.

| Registered Pattern | | Detected Pattern | | After Conversion | |
|---|---|---|---|---|---|
| State | Time | State | Time | (Divided by Time Ratio) | |
| ON | 100 ms | ON | 200 ms | 118 ms | 18 ms deviated |
| OFF | 50 ms | OFF | 95 ms | 56 ms | 6 ms deviated |
| ON | 25 ms | ON | 45 ms | 27 ms | 2 ms deviated |
| OFF | 100 ms | OFF | 170 ms | 101 ms | 1 m deviated |
| ON | 75 ms | ON | 120 ms | 71 ms | −4 ms deviated |
| OFF | 50 ms | OFF | 75 ms | 44 ms | −6 ms deviated |
| ON | 100 ms | ON | 140 ms | 83 ms | −17 ms deviated |

Total Time = 500 ms  Total Time = 845 ms
Ratio = 845 ms/500 ms = 1.69

In the case of the foregoing, it may be contemplated to reject all of the products as an unacceptable, defective product by the time the conveyor transport speed attains a constant value or to move the sensors while the conveyor is halted. However, by rejection of the products as an unacceptable, defective product will result in reduction of the productivity and, on the other hand, to move the sensor results in the use of an extra drive device for moving the sensors and to halt the conveyor results in reduction of the productivity.

Accordingly, in such case, with the information pattern discriminating apparatus of the present invention, if the time of the information pattern signal converted based on the time ratio between the added time of the two information pattern signals before and after the change of the pattern detected of the products and the standard added time of the standard product are within the predetermined tolerated time deviation width, the OK determination is made, but if they are out of the predetermined tolerated time deviation width, the NG determination is made.

Examples of the standard added time in which designated times of the two standard information pattern signals before and after change of the pattern with respect to the standard product are added, are shown below.

| Registered Patterns | | |
|---|---|---|
| State | Time | Standard Added Time |
| ON | 100 ms | 150 ms |
| OFF | 50 ms | 75 ms |
| ON | 25 ms | 125 ms |
| OFF | 100 ms | 175 ms |
| ON | 75 ms | 125 ms |
| OFF | 50 ms | 150 ms |
| ON | 100 ms | (Above value applied) |

In the next place, based on the time ratio between the added time of the two information pattern signals before and after the change of the pattern detected of the products and the standard added time, the time of the information pattern signal before the change of the pattern, for example, is converted and examples of calculated values of deviation between the time width of the information pattern signal so converted and the time width of the standard information signal are illustrated below.

| State | Time | Added Time | Time Ratio | After Conversion (Divided by Time Ratio) | |
|---|---|---|---|---|---|
| ON | 200 ms | 295 ms | 295/150 ms = 1.97 | 101.5 ms | 1.5 ms deviated |
| OFF | 95 ms | 140 ms | 140/75 ms = 1.87 | 50.8 ms | 0.8 ms deviated |
| ON | 45 ms | 215 ms | 215/125 ms = 1.72 | 26.2 ms | 1.2 ms deviated |
| OFF | 170 ms | 290 ms | 290/175 ms = 1.66 | 102.4 ms | 2.4 ms deviated |
| ON | 120 ms | 195 ms | 195/125 ms = 1.56 | 76.9 ms | 1.9 ms deviated |
| OFF | 75 ms | 215 ms | 215/150 ms = 1.43 | 52.4 ms | 2.4 ms deviated |
| ON | 140 ms | (Above value applied) | | 97.9 ms | −2.1 ms deviated |

As described above, the detected deviation of the information pattern signal after having been converted based on the added time of the two information pattern signals before and after the change of the pattern detected of the product and the standard added time will, when comparing with that converted based on the time ratio of the total time of the entirety as described previously, be small at the start of acceleration and at the end of acceleration during the acceleration and will fall within the tolerated time deviation width. This description equally applied even at the start of deceleration and at the end of deceleration during the deceleration. For this reason, it is possible to avoid the possibility that the products at the start and end of acceleration and deceleration of the conveyor may be determined unacceptable.

As hereinbefore described, with the information pattern discriminating apparatus of the present invention, even though the time of movement of the product or the sensors changes (due to acceleration or deceleration), it is possible to comply with it based on the information before and after the change of the pattern and, therefore, the OK/NG determination of the products can be accurately accomplished in a simplified manner and in a short length of time.

It is to be noted that in any one of the foregoing embodiments, detection has been made of the information pattern in the form of the black-and-white grid pattern. However, the pattern to be detected may be colored or in the form of a pattern of surface irregularities. Also, instead of the ON-OFF signal (binary signal) used in any of the foregoing embodiments, an analog signal (indicative of voltage or current) may be equally employed.

Also, although in any one of the foregoing embodiments, the photosensors have been shown and used to detect the information pattern, ultrasonic sensors may be equally employed for the same purpose.

In any one of the foregoing embodiments, the standard signal storage means 5 has been described as storing the single standard information pattern (standard ON-OFF pattern) signal and the determining means 10 has been described as performing the OK/NG determination. However, the standard signal storage means 5 may store a plurality of standard information pattern signals and the determining means 10 may perform the OK/NG determination with respect to a plurality of products so that the plural products can be sorted subsequently.

Yet, in any one of the foregoing embodiments, the sensors have been described as fixed while the products are moved as transported by the conveyor. However, the products may be held still while the sensors are moved to detect the products successively. In such case, the apparatus can accommodate the time deviation of the sensor movement.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. An information pattern discriminating apparatus for discriminating product based on information pattern signal detected of the product by a sensor while one of the product and the sensor is moved relative to the other of the product and the sensor, which said apparatus comprises:
    a standard signal storage unit for storing a standard information pall em signal detected within a designated time width in connection with a product that is used as a standard product;
    a time deviation width setting unit for setting a predetermined tolerated time deviation width of the information pattern signal of the product; and
    a determining unit for comparing the information pattern signal, detected of the product, with the standard information pattern signal and for performing an OK determination in the event that the information pattern signal coincides with the standard information pattern signal within the tolerated time deviation width, but an NG determination in the event that the information pattern signal does not coincide with the standard information pattern signal within the tolerated time deviation width,
    wherein the determining unit is further operable to determine that the information pattern signal and the standard information pattern coincide with each other in the event that the time width of the information pattern signal is different from the designated time width of the standard information pattern signal, the ratio of respective times of constituent patterns of those information pattern signals is the same among different constituent patterns, but that the information pattern signal and the standard information pattern do not coincide with each other in the event that the time width of the information pattern signal deviates from the designated time width by a quantity equal to a predetermined value or more.

2. The information pattern discriminating apparatus as claimed in claim 1, further comprising an input inhibiting circuit for inhibiting an input of a designated input inhibiting information when the input inhibiting information specified in connection with the product is detected from the sensor.

3. The information pattern discriminating apparatus as claimed in claim 1, wherein the information pattern signal is an ON-OFF signal.

4. The information pattern discriminating apparatus as claimed in claim 1, wherein the sensor is a photo sensor.

5. An information pattern discriminating apparatus for discriminating product based on information pattern signal detected of the product by a sensor while one of the product and the sensor is moved relative to the other of the product and the sensor, said apparatus comprises:
    a standard signal storage unit for storing a standard added time of a constituent pattern of a standard information pattern signal, wherein the standard added time comprises the addition of a time width of the constituent pattern and a time width of another constituent pattern of the standard information pattern signal that is before or after the constituent pattern;

a time deviation width setting unit for setting a predetermined tolerated time deviation width of the information pattern signal of the product; and a determining unit for determining an added time of a constituent pattern of the information pattern signal of the product, wherein the added time comprises the addition of a time width of the constituent pattern and a time width of another constituent pattern of the information pattern signal of the product that is before or after the constituent pattern, converting the time width of the constituent pattern to a converted time based on a ratio of the added time of the constituent pattern of the product and the standard added time of the constituent pattern of the standard information pattern signal, performing an OK determination in the event that the difference between the converted time width of the constituent pattern of the information pattern signal and a designated time width of the standard information pattern signal is within a tolerated time deviation width, and an NG determination in the event that the difference between the converted time width of the constituent pattern of the information pattern signal and the designated time width of the standard information pattern signal is not within the tolerated time deviation width.

6. The information pattern discriminating apparatus as claimed in claim 5, wherein the standard signal storage unit stores respective standard information pattern signals associated with a plurality of products and the determining unit performs the OK determination and the NG determination with respect to those plural products.

7. The information pattern discriminating apparatus as claimed in claim 5, wherein the information pattern signal is an ON-OFF signal.

8. The information pattern discriminating apparatus as claimed in claim 5, wherein the sensor is a photo sensor.

* * * * *